(12) United States Patent
Lee et al.

(10) Patent No.: US 6,384,275 B2
(45) Date of Patent: May 7, 2002

(54) METHOD OF PRODUCING ACRYLIC ACID USING A CATALYST FOR ACROLEIN OXIDATION

(75) Inventors: Won-Ho Lee; Kyung-Hwa Kang; Dong-Hyun Ko; Young-Chang Byun, all of Daejeon (KR)

(73) Assignee: LG Chem, Ltd., Taejon (KR)

( * ) Notice: Subject to any disclaimer, the term of this patent is extended or adjusted under 35 U.S.C. 154(b) by 0 days.

(21) Appl. No.: 09/746,875

(22) Filed: Dec. 22, 2000

Related U.S. Application Data

(62) Division of application No. 09/158,877, filed on Sep. 23, 1998, now Pat. No. 6,171,998.

(51) Int. Cl.⁷ .............................................. C07C 51/16
(52) U.S. Cl. ........................ 562/535; 562/533; 562/534
(58) Field of Search ............................... 502/304, 306, 502/310, 311, 312, 314, 315, 316, 317, 318, 321, 353, 354, 439; 562/533, 534, 535

(56) References Cited

U.S. PATENT DOCUMENTS

| | | | |
|---|---|---|---|
| 3,773,692 A | * 11/1973 | Hensel et al. | ........... 252/455 R |
| 3,893,951 A | * 7/1975 | Grasselli et al. | ............ 252/468 |
| 3,997,600 A | * 12/1976 | Ferlazzo et al. | ........ 260/530 N |
| 4,146,732 A | 3/1979 | Padovan et al. | |
| 4,157,987 A | 6/1979 | Dolhyj et al. | |
| 4,259,211 A | 3/1981 | Krabetz et al. | |
| 4,378,309 A | 3/1983 | Shaw et al. | |
| 4,382,880 A | 5/1983 | Derrien | |
| 4,563,440 A | 1/1986 | Forzatti et al. | |
| 4,620,035 A | 10/1986 | Krabetz et al. | |
| 4,621,072 A | 11/1986 | Arntz et al. | |
| 4,851,381 A | * 7/1989 | Hums | ......................... 502/209 |
| 4,892,856 A | 1/1990 | Kawajiri et al. | |
| 4,916,103 A | 4/1990 | Martan et al. | |
| 5,132,269 A | 7/1992 | Sasaki et al. | |
| 5,446,004 A | 8/1995 | Tenten et al. | |
| 5,583,084 A | 12/1996 | Martin et al. | |
| 5,885,922 A | 3/1999 | Hirbst et al. | |
| 5,910,608 A | 6/1999 | Tenten et al. | |

FOREIGN PATENT DOCUMENTS

| | | |
|---|---|---|
| EP | 0 293 859 A1 | 12/1988 |
| JP | 49-117419 A | 11/1974 |
| JP | 58-166939 A | 10/1983 |
| JP | 64-63543 A | 3/1989 |
| KR | 93-7409 A | 5/1993 |

* cited by examiner

*Primary Examiner*—Steven P. Griffin
*Assistant Examiner*—Cam N. Nguyen
(74) *Attorney, Agent, or Firm*—Knobbe, Martens, Olson and Bear, LLP.

(57) ABSTRACT

A method of producing acrylic acid using a catalyst for acrolein oxidation reaction. Metallic salt components of the catalyst including molybdate, vanadate and tungstate are dissolved in water. An additional metallic salt component of the catalyst is added to the aqueous solution of the salts to form a suspension of the catalyst. In the suspension, the total weight of water is about 0.8 to about 5 times of the total weight of the metallic salts in the catalyst. This method of preparing suspension minimizes the amount of water required to dissolve the metallic salts, which reduces the amount of time and energy to be used in evaporating water from the suspension in the following step of obtaining catalyst. Additionally, in obtaining catalyst from the suspension prepared by this method, it is possible to avoid the deterioration of the catalytic performance since less heat is required to evaporate the water. Disclosed also is a method of producing a carrier-retained catalyst. Catalyst particles suspended in the water are split or ground into smaller particles to maintain homogeneous suspension. The suspension is sprayed to an inert carrier while applying heated air flow to remove water and obtain a carrier-retained catalyst.

17 Claims, No Drawings

METHOD OF PRODUCING ACRYLIC ACID USING A CATALYST FOR ACROLEIN OXIDATION

RELATED APPLICATIONS

This application is a divisional application of U.S. patent application Ser. No. 09/158,877, filed Sep. 23, 1998, U.S. Pat. No. 6,171,998, issued Jan. 9, 2001.

BACKGROUND OF THE INVENTION

1. Field of the Invention

The present invention relates to a catalyst for acrolein oxidation, more particularly, to production of the catalyst containing molybdenum, vanadium, and tungsten as essential components.

2. Description of the Related Technology

In producing of acrylic acid, oxidation reactions of acrolein with oxygen molecules in the presence of a catalyst have been widely used. The preparation of the catalyst has been researched to obtain a high yield of the acrylic acid, which are primarily directed to the components of the catalyst and the composition thereof. Also, some methods of producing a carrier-retained catalyst have been provided in the prior art.

Japanese Patent Application Laid-Open Nos. Showa 49-117419, Showa 58-166939, and Showa 64-63543, and European Patent Application Laid-Open No. 293,859/1988 disclose methods for producing a carrier-retained catalyst, in which aqueous solutions of metallic salts of catalyst components are mixed and coprecipitated to produce a suspension of a catalyst. An inert carrier, which has a small surface area and a large aperture ratio, such as round or cylindrical silicon carbide, silica, and silica-alumina, is added to the suspension, and water is evaporated by heating the suspension with agitation to produce a catalyst retained within the structure of the inert carrier.

Further, in U.S. Pat. Nos. 4,157,987, 4,259,211 and 4,892,856; and Korean Patent Application Laid-Open No. 7409/1993, a suspension of a catalyst is heated to evaporate water while being stirred. Anhydrous solid of the catalyst is obtained and is ground to powder, which is coated on an inert carrier, such as aldundum, by using a coater.

The inert carriers retain the catalyst in their structures and prevent the release of the catalyst at a time. Accordingly, occurrence of excessive oxidation reactions, which may be caused by supply of abundant catalyst, can be avoided. Also, the inert carrier functions as heat buffer by absorbing the heat generated during the oxidation reaction.

Korean Patent Application Laid-Open No. 7409/1993 and U.S. Pat. No. 4,892,856/1990 disclose that physical properties, such as non-surface area, pore volume, and pore diameter distribution, vary in the catalysts prepared even from the identical component metallic salts and composition thereof. The variance in the physical properties of catalysts results in the variance in the catalytic performance of catalysts, i.e., the acrolein turnover ratio and acrylic acid yield. This means the physical properties and accordingly the catalytic performance of the catalysts change, depending on the preparational manipulations as well as the conditions thereof, which also causes the lack of reproducibility in preparing the catalyst. In addition, these variances of the catalytic performance sometimes exceed those by the changes in the components and the composition of the catalyst.

However, there has not yet been a report, which satisfactorily addresses that the physical properties and accordingly catalytic performance of a catalyst change, depending on the process of producing the catalyst including the preparation of a suspension or powder therefrom.

Meantime, in the preparation of the aqueous solution of metallic salts, an excessive amount of water is required to dissolve some metallic salts having low solubility in water, such as ammonium metavanadate and ammonium paratungstate. The amount of water in the suspension of the catalyst is from about 5 to about 10 times by weight of the salts. The solubility improves when the temperature of water increases, but heating of the aqueous solution of the salts deteriorates the catalytic performance.

The water used to prepare the suspension has to be completely removed to form a powder catalyst. Accordingly, the amount of energy and time required to remove the water has a direct relation to the amount of water used. Further, in the case where an inert carrier is added to the suspension to produce a carrier-retained catalyst, additional time is required to remove the water within the carrier structure.

SUMMARY OF THE INVENTION

One aspect of the present application provides a method of producing an acrylic acid. The method comprises preparing a suspension of catalyst particles in a supporting liquid; breaking the catalyst particles into smaller pieces while suspended in the liquid; applying thus-formed smaller catalyst particles in suspension to a carrier; drying the carrier and the catalyst particles applied thereto, thereby forming a carrier-retained catalyst; and reacting acrolein with a gas containing oxygen in the presence of the carrier-retained catalyst. The catalyst comprises metallic components of molybdenum, tungsten and vanadium.

The preparation of the suspension advantageously comprises dissolving molybdate, vanadate and tungstate in water to obtain a first aqueous solution of the metallic salts; and adding to the first aqueous solution additional metallic salts comprising salts of metal A and metal. A is at least one element selected from the group consisting of iron, copper, bismuth, chromium, tin, antimony, nickel, cobalt, manganese, cerium and thallium, and B is at least one element selected from the group consisting of an alkali metal and an alkali earth metal.

The catalyst is represented by a following chemical formula: $Mo_a W_b V_c A_d B_e O_x$. Here a, b, c, d, e and x respectively indicate the atomic ratio for Mo, W, V, A, B and O. When a=10, then b=1.5 to 4, c=1 to 5, d=1 to 4, and e=0 to 2 and x is determined according to oxidation states of the other elements.

The carrier is at least one selected from the group consisting of aldundum, silicon carbide, silica, and silica-alumina. The application of the catalyst particles to the carrier and drying thereof comprises spraying the suspension of the catalyst particles to the carrier while heated air is supplied to dry and obtain a carrier-retained catalyst. The particles of the catalyst are broken by at least one selected from the group consisting of ball mill, attrition mill, dynamo mill, homogenizer, and supersonic homogenizer.

DETAILED DESCRIPTION OF THE PREFERRED EMBODIMENT

The inventors of the present invention have discovered that properties of a catalyst suspended in the water solution change when the suspension of the catalyst is heated to a high temperature. In addition, the properties of the catalyst change when the catalyst suspension is heated for a long period of time. The property changes cause deterioration of the catalytic activity or performance later. This also leads to a reduction in the reproducibility of the catalyst, and the performance of the powder catalyst or the carrier-retained catalyst becomes hard to control.

However, as noted above in the background of the invention supra, to reduce the heat application to the catalyst suspension, it is required to minimize the amount of water needed to dissolve the metallic salts. In this regard, the inventors also have discovered that some metallic salts dissolve in water better when they dissolve in an aqueous solution mixture of other metallic salts than when they dissolve in water separately. Specifically, molybdate, vanadate and tungstate, which are essential to produce a highly active catalyst, dissolve in water and form a concentrated aqueous solution mixture with higher solubility than each of the separate aqueous solutions thereof.

In accordance with one aspect of the present invention, first metallic salt components of the catalyst, which have low water-solubility, are dissolved together in water to form an aqueous solution of the salts. Each metallic salt dissolves in the aqueous solution more than it dissolves in water alone. The remaining metallic salt components of the catalyst, which have high water-solubility, or the aqueous solution thereof are added to the aqueous solution prepared above to form a catalyst suspension. The amount of water required to prepare the suspension of the catalyst can be drastically reduced, which in turn reduces the time and energy in removing the water to produce a powder catalyst in the following step. Further, since less heat is required to evaporate the water from the suspension, the property changes of the catalyst due to the heat application for a long time, which may cause the deterioration of the catalytic performance, do not appear.

In the preparation of a catalyst suspension, molybdate, vanadate and tungstate are dissolved in water at a temperature of at least about 90° C., preferably in boiling water. Once they are completely dissolved, the aqueous solution is cooled to a temperature between about 60° C. and about 80° C. The remaining salts of metal A and metal B, or an aqueous solution of these metallic salts, are added to produce a catalyst suspension. Here, metal A is at least one element selected from the group consisting of iron, copper, bismuth, chromium, tin, antimony, nickel, cobalt, manganese, cerium and thallium, and metal B is at least one element selected from the group consisting of an alkali metal and an alkali earth metal. The total amount of water with reference to the amount of the metallic salt components of the catalyst by weight is about 0.8 to about 5 times, and preferably about 1 to about 2 times.

The water is evaporated from the suspension by heating and an anhydrous solid of the catalyst remains. The solid is ground and dried to obtain a powder catalyst, which is represented by the Chemical Formula I below. The powder catalyst is finally coated on an inert carrier, such as aldundum, to produce a carrier-retained catalyst. Alternatively, an inert carrier, such as round or cylindrical silicon carbide, silica, and silica-alumina, is added to the catalyst suspension, and the water is evaporated by heating the suspension with the inert carrier to produce a catalyst retained within the structure of the inert carrier.

  [Chemical Formula 1]

Wherein, a, b, c, d, e and x respectively indicate the atomic ratio for Mo, W, V, A, B and O, in which when a=10, then b=1.5 to 4, c=1 to 5, d=1 to 4, and e=0 to 2 and x is determined according to oxidation states of the other elements.

The performance of the dried catalyst powder is superior to that of the dried catalyst produced by using a large amount of water in the preparation of a catalyst suspension, which is heated at an identical temperature as above and for a long period of time. Ultimately, the performance of the carrier-retained catalysts is also improved.

In accordance with another aspect of the present invention, provided is an alternative method of producing a carrier-retained catalyst. The catalyst suspension is sprayed onto an inert carrier, while it is dried by heated air.

A catalytic suspension is prepared by the above method in accordance with one aspect of the present invention or any other method known in the art. However, when a catalyst suspension is prepared by mixing and stirring two different aqueous solutions, in which one has the metallic components as cation and the other has the metallic components as anion, the catalyst particles promptly settle down. When the agitation is discontinued, the catalyst particles precipitate and form phase separation from water.

When the catalyst suspension is sprayed on the carriers to produce carrier-retained catalysts, it is difficult to obtain homogeneous coating if the catalyst particles settle downward and phase separation occurs. In addition, if the settling speed of the particles is fast, the transfer and spray of the suspension by pumping is not possible. The inhomogeneity of the suspension may also affect the catalytic performance and the reproducibility of the catalyst in producing the carrier-retained catalyst.

According to the present invention, the crystal particles suspended are advantageously split or ground into smaller particles to maintain the homogeneous suspension of the catalyst. At least one of ball mill, attrition mill, dynamo mill, homogenizer, or supersonic homogenizer can be advantageously used to split or ground the catalyst particles with out without agitation. Any conventional method for making particle size smaller can also be used.

The catalyst particles are split or ground so that the suspended particles can be transferred and sprayed through a nozzle without being stuck. The size of the particles in the suspension advantageously has the diameter of less than about 10 microns. The particles of these sizes settle slowly and do not cause the phase separation even at slow agitation, which makes the catalyst suspension homogeneous. As a result, the settling speed of the precipitate is controlled so that spray coating of the catalyst suspension can be possible. The suspension, in which the particle sizes get smaller, is sprayed onto inert carriers and simultaneously dried with heated air to produce the carrier-retained catalyst.

The splitting or grinding the particles can be made after the complete production of the catalyst particle suspension from the aqueous solution of the metallic salt components of the catalyst. This operation can also be made during the production of the catalyst particle suspension, and advantageously simultaneously with the production of the catalyst particles.

According to the present invention, the inert carrier can be at least one from the group consisting of aldundum, silica-alumina, and silicon carbide. Advantageously, the catalyst can also be coated by a rotatory sugar coater, centrifugal flow coater, or a pherudizer.

According to the present invention, for the metals of molybdenum, vanadium, and tungsten, any salts can be advantageously used. For those of metals A and B, a nitrate, acetate, carbonate, and organate can be used, but chloride or sulfate of them is not preferable.

A gas phase oxidation reaction in the presence of the carrier-retained catalyst produced according to the present invention is carried out in the manner known in the art. For example, 1 to 10 volume % of acrolein, 1 to 15 volume % of oxygen molecules, 5 to 60 volume % of aqueous vapor, and 20 to 80 volume % of inert gas (totally 100%) react in the presence of the catalyst at a temperature of 200 to 350° C. between atmospheric pressure and 3 atmospheric pressures, at a space velocity (STP) of 500 to 4,000 hr$^{-1}$.

The present invention will now be further described by the following examples:

EXAMPLE 1

950 ml of distilled water was heated to boil. 120 g of ammonium paratungstate, 405 g of ammonium molybdate, and 94 g of ammonium metavanadate were added in order and stirred until they are completely dissolved, while the mixture was being heated to boil. An aqueous solution prepared by dissolving 111 g of copper nitrate and 39 g of strontium nitrate in 50 ml of water was added to the above ammonium salt aqueous solution to form a suspension. The ratio of the amounts of water to metallic salt in the solution by weight was 1.3:1. The suspension was stirred and heated to evaporate the water and obtain an anhydrous solid, while the temperature was maintained to 70° C. The anhydrous solid was dried at 120° C., a part of which was ground to obtain a powder catalyst with 80-120 mesh particle sizes. The powder catalyst was coated onto aldundum having a diameter of 3/16 of an inch by using water as a binder. The carrier-coated catalyst was dried at 120° C. and sintered for 5 hours at 400° C. while fresh air was supplied. After the sintering, the catalyst powder was 30 wt. %, and the composition of the components except for the oxygen was $Mo_{10}W_2V_{3.5}Cu_2Sr_{0.8}$.

COMPARATIVE EXAMPLE 1

Added to 4300 ml of distilled water heated to 80° C. were, in order, 120 g of ammonium paratungstate, 405 g of ammonium molybdate, and 94 g of ammonium metavanadate. The mixture was stirred until all the metallic salts were dissolved. An aqueous solution prepared by dissolving 111 g of copper nitrate and 39 g of strontium nitrate in 300 ml of water was mixed with the above ammonium salt aqueous solution. The ratio of the amounts of water to metallic salt in the solution by weight was 6:1. This suspension was stirred and heated to a temperature between 80° C. and 85° C. to evaporate the water and obtain an anhydrous solid. The anhydrous solid was dried at 120° C., a part of which was ground to obtain a powder catalyst with 80–120 mesh particle sizes. The powder catalyst was then coated, by using water as a binder, onto aldundum having a diameter of 3/16 of an inch. The carrier-coated catalyst was dried at 120° C. and sintered for 5 hours at 400° C., while fresh air was supplied. After the sintering, the catalyst powder was 30 wt. %, and the composition of the components except for oxygen, was $Mo_{10}W_2V_{3.5}Cu_2Sr_{0.8}$.

COMPARATIVE EXAMPLE 2

The same experiment as in Comparative Example 1 was repeated except that the suspension was stirred and heated to a temperature between 90° C. and 95° C. to evaporate the water and obtain an anhydrous solid. The catalyst powder was 25 wt. %, and the composition of the elements, without oxygen, was $Mo_{10}W_2V_{3.5}Cu_2Sr_{0.8}$.

EXAMPLE 2

1100 ml of distilled water was stirred and heated to boil. 120 g of ammonium paratungstate, 405 g of ammonium molybdate, and 94 g of ammonium metavanadate were added in order and stirred until they are completely dissolved, while the mixture was being heated to boil. An aqueous solution prepared by dissolving 100 g of copper nitrate, 18.6 g of iron nitrate, 24.4 g of strontium nitrate, and 1.2 g of potassium nitrate in 75 ml of water was added to the above ammonium salt aqueous solution to form a suspension. The ratio of the amounts of water to metallic salt in the solution by weight was 1.5:1. A portion of this suspension was charged in an evaporator maintained at a temperature of 70 to 75° C., and 1000 ml of silica-alpha alumina carrier particles (SA 5218 of Norton Corp.), having a diameter of 5 mm and preheated to between 70 and 75° C., was added thereto. The mixture was maintained at a temperature between 70 to 75° C. while being stirred, and the water was evaporated therefrom, thereby obtaining an anhydrous solid. The anhydrous solid was then combusted for 5 hours at 400° C. to produce a catalyst. Here, active catalyst components occupied 30% of a total carrier catalyst weight.

COMPARATIVE EXAMPLE 3

3600 ml of distilled water was stirred and heated to boil. 120 g of ammonium paratungstate, 405 g of ammonium molybdate, and 94 g of ammonium metavanadate were added in order and stirred until they are completely dissolved, while the mixture was being heated to boil. An aqueous solution prepared by dissolving 100 g of copper nitrate, 18.6 g of iron nitrate, 24.4 g of strontium nitrate, and 1.2 g of potassium nitrate in 250 ml of water was added to the above ammonium salt aqueous solution to form a suspension. The ratio of the amounts of water to metallic salt in the solution by weight was 5:1.

A portion of this suspension was charged in an evaporator maintained at a temperature of 80 to 85° C., and 1000 ml of silica-alpha alumina carrier particles (SA 5218 of Norton Corp.), having a diameter of 5 mm and preheated to over 80° C., was added thereto. The mixture was maintained at a temperature between 80 to 85° C. while being stirred, and the water was evaporated therefrom, thereby obtaining an anhydrous solid. The anhydrous solid was then combusted for 5 hours at 400° C. to produce a catalyst. Here, active catalyst components occupied 25% of a total carrier catalyst weight.

COMPARATIVE EXAMPLE 4

The same experiment as in Comparative Example 3 was repeated except that the temperature of the suspension was maintained and the carrier particles was preheated was all between 90° C. and 95° C. to evaporate the water and obtain an anhydrous solid. Here, the active catalyst components occupied 30% of the total carrier catalyst weight.

EXAMPLE 3

28.2 l of distilled water was added to a 50 l glass reactor, in which a conventional stirrer and homogenizer are installed. The water was heated to a boil. While maintaining the boiling state of the water, added to the same, in order, were 3,000 g of ammonium paratungstate, 10,125 g of ammonium molybdate, and 2,350 g of ammonium metavanadate, and the mixture was stirred until all the metallic salts were dissolved. While rotating a rotor of the homogenizer at 4,000 rpm, an aqueous solution prepared by dissolving 2,755 g of copper nitrate and 975 g of strontium nitrate in 2.6 l of water was mixed with the above ammonium salt aqueous solution. The homogenizer remained operating for 30 minutes after the above two aqueous solutions were completely mixed. A suspension was extracted, and the particle size of a precipitate was measured. Here, over 70% of the precipitate had a particle size of about 10 microns, the average particle size was 45 microns, and no particle size over 80 microns was discovered.

The suspension produced as in the above process was sprayed onto aldundum, having a diameter of 3/16 of an inch, of a sugar coater through a spray nozzle. Simultaneously, the aldundum was dried with air heated to 90° C., thereby completing the coating on aldundum. The carrier-retained catalyst was dried at 120° C. and sintered for 5 hours at 400° C. while fresh air was supplied. After the sintering, the carrier and catalyst powder were 30 wt. %. A composition of the component except for oxygen was $Mo_{10}W_2V_{3.5}Cu_2Sr_{0.8}$.

COMPARATIVE EXAMPLE 5

A suspension was produced identically as in Example 3 except that only a stirrer, and no homogenizer, was used. When stirring was discontinued, the precipitate quickly settled. When measured, over 30% of the precipitate had a particle size exceeding 100 microns. This suspension was quickly stirred, and coating on a carrier was attempted. However, the suspension became clogged in the pump and transfer pipes, making the coating operation impossible to perform.

EXAMPLE 4

Using both a stirrer and a homogenizer, the particle size of the precipitate in the suspension of Comparative Example 5 was reduced. According to the results of a particle size analyzer, 60% of the precipitate had an average particle size of 22 microns, while the remaining 40% of the precipitate had an average particle size of 60 microns, with less than 5% of the precipitate having a particle size of between 80 and 90 microns. Using this suspension, a carrier catalyst was produced identically as in Example 1. Further, no clogging in the pump, transfer pipes, or the spray nozzle occurred, and the composition of the element without oxygen was $Mo_{10}W_2V_{3.5}Cu_2Sr_{0.8}$.

EXAMPLE 5

22.4 l of distilled water was heated to a boil while being stirred. While maintaining the boiling state of the water, added to the same, in order, were 1800 g of ammonium paratungstate, 6075 g of ammonium molybdate, and 1410 g of ammonium metavanadate, and the mixture was stirred until all the chemicals dissolved. An aqueous solution, which was prepared by dissolving 1500 g of copper nitrate, 279 g of iron nitrate, 366 g of strontium nitrate, and 18 g of potassium nitrate in 2.25 l of water, was mixed with the above ammonium salt aqueous solution. A homogenizer was operated at 4000 rpm and particles of the precipitate were ground as in Example 3. The resulting suspension was then placed in a sugar coater and coated on 5 mm Norton Corp. SA 5218 silica-alpha alumina carrier particles through a spray nozzle. Concurrently with this process, the suspension was dried using heated air, thereby obtaining a carrier-retained catalyst. The final catalyst was obtained by using the drying and sintering method of Examples 3 and 4. The composition of the element, without oxygen, was $Mo_{10}W_2V_{3.5}Cu_{1.8}Fe_{0.2}Sr_{0.5}K_{0.05}$.

TEST EXAMPLE

Catalyst Activation Test

A catalyst activation test was conducted for the catalysts produced in the above examples and comparative examples. 70 g of the catalyst produced in each example was place in a ¾-inch steel reaction tube, which is surrounded by 3 electric furnaces. A mixture of 6.5 volume % of acrolein, 13 volume % of oxygen, 70.5 volume % of nitrogen, and 10 volume % of water vapor was introduced into a reactor at atmospheric pressure. The temperature of the reactor was set at 260° C. for the catalysts produced in Examples 1 and 2, Comparative Examples 1 to 4, and at 255° C. for the catalysts produced in Examples 3 to 5, and Comparative Example 5. At a space velocity of 1500 hr$^{-1}$, the reaction test was performed. After 72 hours of reaction, the composition of the produced material was analyzed to obtain the turnover ratio of acrolein and the acrolein yield in a single flow. The results of the test appear in Table 1 below.

In the present invention, the turnover ratio and the yield in a single flow were determined by the following mathematical formulas, respectively.

Mathematical Formula 1

Turnover ratio (%)=[The number of moles of reacted acrolein]÷[The number of moles of charged acrolein×100]

Mathematical Formula 2

Yield in a single flow(%)=[The number of moles of produced acrolein]÷[The number of moles of charged acrylic acid×100]

TABLE 1

|  | Mo | W | V | A | B | Water to metallic salt by weight | Heating Temp. | Acrolein turnover | Acrylic Acid Yield |
|---|---|---|---|---|---|---|---|---|---|
| Ex. 1 | 10 | 2 | 3.5 | Cu 2 | Sr 0.8 | 1.3:1 | 70 | 98 | 94.1 |
| Com. Ex. 1 | 10 | 2 | 3.5 | Cu 2 | Sr 0.8 | 6:1 | 80 | 93 | 88.5 |
| Com. Ex.2 | 10 | 2 | 3.5 | Cu 2 | Sr 0.8 | 6:1 | 90 | 89 | 86.3 |
| Ex.2 | 10 | 2 | 3.8 | Cu 1.8 Fe 0.2 | Sr 0.5 K 0.05 | 1.5:1 | 70 | 96 | 93.3 |
| Com. Ex. 3 | 10 | 2 | 3.8 | Cu 1.8 Fe 0.2 | Sr 0.5 K 0.05 | 5:1 | 80 | 90 | 87.3 |
| Com. Ex. 4 | 10 | 2 | 3.8 | Cu 1.8 Fe 0.2 | Sr 0.5 K 0.05 | 5:1 | 90 | 85 | 82.5 |
| Ex. 3 | 10 | 2 | 3.5 | Cu 2 | Sr. 0.8 | 1.6:1 | — | 98.8 | 94.2 |

TABLE 1-continued

|  | Mo | W | V | A | B | Water to metallic salt by weight | Heating Temp. | Acrolein turnover | Acrylic Acid Yield |
|---|---|---|---|---|---|---|---|---|---|
| Com. Ex. 5 | 10 | 2 | 3.5 | Cu 2 | Sr 0.8 | 1.6:1 | — | —* | —* |
| Ex. 4 | 10 | 2 | 3.8 | Cu 2 | Sr 0.8 | 1.6:1 | — | 98.2 | 93.5 |
| Ex. 5 | 10 | 2 | 3.8 | Cu 1.8 Fe 0.2 | Sr 0.5 K 0.05 | 2.15:1 | — | 97.5 | 93.0 |

*The measurement was not possible.

What is claimed is:

1. A method of producing an acrylic acid, comprising:
   preparing a carrier-retained catalyst, and
   reacting acrolein with a gas containing oxygen in the presence of the carrier-reacting catalyst,
   wherein the carrier-retained catalyst is prepared by a method comprising:
      preparing a suspension of catalyst particles in a supporting liquid, the catalyst comprising metallic components comprising molybdenum, tungsten and vanadium;
      breaking the catalyst particles into smallar pieces;
      applying thus-formed smaller catalyst particles in suspension to a carrier; and
      drying the carrier and the catalyst particles applied thereto to obtain the carrier-retained catalyst.

2. The method as defined in claim 1, wherein the preparation of the suspension comprises:
   dissolving molybdate, vanadate and tungstate in water to obtain a first aqueous solution of the metallic salts; and
   adding to the first aqueous solution additional metallic salts comprising salts of metal A and metal B, wherein A is at least one element selected from the group consisting of iron, copper, bismuth, chromium, tin, antimony, nickel, cobalt, manganese, cerium and thallium, and B is at least one element selected from the group consisting of an alkali metal and an alkali earth metal.

3. The method as defined in claim 2, wherein the total weight of water is about 0.8 to about 5 times of the total weight of the metallic salts in the catalyst.

4. The method as defined in claim 3, wherein the total weight of water is about 1 to about 2 times of the total weight of the metallic salts in the catalyst.

5. The method as defined in claim 2, wherein the molybdate, vanadate and tungstate are dissolved in water heated to at least about 90° C.

6. The method as defined in claim 5, wherein the molybdate, vanadate and tungstate are dissolved in boiling water.

7. The method as defined in claim 5, wherein the first aqueous solution is cooled to a temperature between about 60° C. and about 80° C.

8. The method as defined in claim 2, wherein the additional salts are directly dissolved into the first aqueous solution.

9. The method as defined in claim 2, wherein the additional salts are dissolve into water to form a second aqueous solution, and the second aqueous solution is added to the first aqueous solution.

10. The method as defined in claim 2, wherein the catalyst is represented by a following chemical formula:

$$Mo_aW_bV_cA_dB_eO_x,$$

wherein, a, b, c, d, e and x respectively indicate the atomic ratio for Mo, W, V, A, B and O, wherein when a=10, then b=1.5 to 4, c=1 to 5, d=1 to 4, and e=0 to 2 and x is determined according to oxidation states of the other elements.

11. The method as defined in claim 1, wherein the carrier is selected from the group consisting of aldundum, silicon carbide, silica, and silica-alumina.

12. The method as defined in claim 1, wherein the application of the catalyst particles to the carrier and drying thereof comprises
   spraying the suspension of the catalyst particles to the carrier while heated air is supplied to dry and obtain a carrier-retained catalyst.

13. The method as defined in claim 1, wherein the breaking step is conducted before the application of the catalyst particles.

14. The method as defined in claim 1, wherein the breaking step is conducted during the preparation of the suspension.

15. The method as defined in claim 1, wherein the breaking step is conducted after the suspension is completely prepared.

16. The method as defined in claim 1, wherein the particles of the catalyst are broken by at least one selected from the group consisting of ball mill, attrition mill, dynamo mill, homogenizer, and supersonic homogenizer.

17. The method as defined in claim 1, wherein the particles of the catalyst are broken to a size of less than about 10 microns in diameter.

* * * * *